(12) United States Patent
Lee

(10) Patent No.: US 8,570,863 B2
(45) Date of Patent: Oct. 29, 2013

(54) METHOD AND APPARATUS FOR AVOIDING COLLISION OF UPLINK PREAMBLE USING CELL IDENTIFIER

(75) Inventor: Chan Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 380 days.

(21) Appl. No.: 12/944,472

(22) Filed: Nov. 11, 2010

(65) Prior Publication Data

US 2011/0149728 A1 Jun. 23, 2011

(30) Foreign Application Priority Data

Dec. 21, 2009 (KR) ........................ 10-2009-0128074

(51) Int. Cl.
*G01R 31/08* (2006.01)
(52) U.S. Cl.
USPC .......................................... 370/230; 370/252
(58) Field of Classification Search
USPC ................................................ 370/230, 252
See application file for complete search history.

(56) References Cited

U.S. PATENT DOCUMENTS

2009/0135761 A1* 5/2009 Khandekar et al. ............ 370/328
2009/0247172 A1* 10/2009 Palanki et al. ................. 455/447
2009/0259910 A1* 10/2009 Lee et al. ........................ 714/748

FOREIGN PATENT DOCUMENTS

| KR | 1020080018105 | 2/2008 |
| KR | 1020090016402 | 2/2009 |
| KR | 10-2009-0043434 | 5/2009 |
| KR | 1020090093605 | 9/2009 |
| WO | 2008/042967 A2 | 4/2008 |

* cited by examiner

*Primary Examiner* — Sai-Ming Chan
(74) *Attorney, Agent, or Firm* — Nelson Mullins Riley & Scarborough LLP

(57) ABSTRACT

A method and apparatus for avoiding a collision of an uplink preamble using a cell identifier. In a case of installing a new small-sized base station in a mobile communication system, the method and apparatus may set a code parameter, a time parameter, and a frequency parameter, differently from a neighboring small-sized base station using the cell identifier even when dedicatedly using a preamble in a contention-free scheme to avoid a collision of the preamble, so that a random access preamble may be managed without occurrence of the collision with the neighboring small-sized base stations.

11 Claims, 6 Drawing Sheets

METHOD AND APPARATUS FOR AVOIDING COLLISION OF UPLINK PREAMBLE USING CELL IDENTIFIER

CROSS-REFERENCE TO RELATED APPLICATION

This application claims the priority benefit of Korean Patent Application No. 10-2009-0128074, filed on Dec. 21, 2009, in the Korean Intellectual Property Office, the disclosure of which is incorporated herein by reference.

BACKGROUND

1. Field

One or more embodiments relate to a method and apparatus for avoiding a collision of an uplink preamble using a cell identifier (ID), and more particularly, to a method and apparatus which may avoid a collision of an uplink preamble, in a case of newly installing a base station in a mobile communication system, by configuring a random access preamble, that is, a signature that may automatically perform an uplink synchronization and a radio resource acquirement when being initially operated or while being operated, without occurrence of a collision with neighboring cells.

2. Description of the Related Art

In a mobile communication system, particularly, in a Long Term Evolution (LTE) system of a 3rd Generation Partnership Project (3GPP), a terminal may generally perform a random access process, so that the terminal may access a network. By performing the random access process via the network by the terminal, an initial access, a handover, and the like may be realized.

The random access process may be classified into a contention scheme and a contention-free scheme, and a difference between the two schemes may be whether a random access preamble is dedicatedly assigned to a terminal to be used. Specifically, in the contention-free scheme, since a unique terminal and a unique preamble are used, a collision may not occur. In the contention scheme, since a preamble randomly selected by the terminal is used, at least two terminals may use an identical preamble, and thus a probability of occurrence of the collision may increase.

However, even in the contention-free scheme, in a case where a large number of femto cells is present within a macro cell, code parameters, time parameters, and frequency parameters between neighboring cells may be the same when a limited preamble resource is dedicatedly used, resulting in occurrence of the collision.

SUMMARY

One or more embodiments provide a method and apparatus of avoiding a collision of an uplink preamble using a cell identifier.

One or more embodiments also provide a method and apparatus of avoiding a collision of an uplink preamble using a cell identifier in a newly installed or deployed small-sized base station.

One or more embodiment also provide a method and apparatus of avoiding a collision of an uplink preamble by setting a preamble parameter of a small-sized base station newly installed or deployed in an Operation Administration Maintenance (OAM), differently from neighboring small-sized base stations adjacent to the small-sized base station, using cell identifiers of the neighboring small-sized base stations.

According to an aspect of one or more embodiments, there may be provided an apparatus for avoiding a collision of a preamble in a small-sized base station, the apparatus including: a neighboring cell identifying unit to collect a cell identifier of a neighboring cell to verify presence/absence of the neighboring cell and to identify the neighboring cell; a mapping database to store predetermined parameters corresponding to each of predetermined cell identifiers; a cell identifier allocation unit to select, from the mapping database, a cell identifier unused in neighboring cells, and to allocate the selected cell identifier to a corresponding small-sized base station; and a parameter setting unit to verify, in the mapping database, parameters corresponding to the allocated cell identifier, and to set the verified parameters as parameters of the preamble.

According to another aspect of one or more embodiments, there may be provided an apparatus for avoiding collision of a preamble in a small-sized base station, the apparatus including: a neighboring cell identifying unit to collect a cell identifier of a neighboring cell to verify presence/absence of the neighboring cell and to identify the neighboring cell; a parameter requesting unit to generate a parameter request message requesting a setting of parameters and including the cell identifier of the neighboring cell, and to transmit the generated parameter request message to an OAM; and a parameter setting unit to verify an allocated cell identifier included in a parameter response message and parameters corresponding to the allocated cell identifier when receiving the parameter response message from the OAM, and to set a preamble using the verified parameters.

According to still another aspect of one or more embodiments, there may be provided an apparatus for avoiding collision of a preamble in an OAM, the apparatus including: a parameter request reception unit to verify a cell identifier of a neighboring cell included in a parameter request message when receiving the parameter request message from a small-sized base station being incapable of independently setting a parameter; a mapping database to store predetermined parameters corresponding to each of predetermined cell identifiers; a cell identifier allocation unit to select, from the mapping database, a cell identifier unused in neighboring cells, and to allocate the selected cell identifier to a corresponding small-sized base station; and a parameter response processing unit to verify, in the mapping database, parameters corresponding to the allocated cell identifier, to generate a parameter response message including the allocated cell identifier and the parameters corresponding to the allocated cell identifier, and to transmit the generated parameter response message to the small-sized base station.

According to yet another aspect of one or more embodiments, there may be provided a method for avoiding a collision of a preamble in a small-sized base station, the method including: collecting a cell identifier of a neighboring cell to verify presence/absence of neighboring cells, and to identify the neighboring cell; selecting, from a mapping database where predetermined parameters corresponding to each of predetermined cell identifiers are stored, a cell identifier unused in neighboring cells, and allocating the selected cell identifier to the small-sized base station; and verifying, in the mapping database, parameters corresponding to the allocated cell identifier, and setting the verified parameters as parameters of the preamble.

According to further aspect of one or more embodiments, there may be provided a method for avoiding a collision of a preamble in a small-sized base station, the method including: collecting a cell identifier of a neighboring cell to verify presence/absence of the neighboring cells, and to identify the neighboring cell; generating a parameter request message including the cell identifier of the neighboring cell requesting a setting of parameters, transmitting the generated parameter request message; and verifying an allocated cell identifier included in the parameter request message and parameters corresponding to the allocated cell identifier when receiving a parameter response message from an OAM; and setting the preamble using the verified parameters.

According to further aspect of one or more embodiments, there may be provided a method for avoiding collision of a preamble in an OAM, the method including: verifying a cell identifier of a neighboring cell included in a parameter request message when receiving the parameter request message from a small-sized base station being incapable of independently setting a parameter; selecting, from a mapping database where predetermined parameters corresponding to each of predetermined cell identifiers are stored, a cell identifier unused in neighboring cells, and allocating, to the small-sized base station, the selected cell identifier as a cell identifier of the small-sized base station; verifying, in the mapping database, parameters corresponding to the allocated cell identifier; and generating a parameter response message including the allocated cell identifier and parameters corresponding to the allocated cell identifier, and transmitting the generated parameter response message to the small-sized base station.

Additional aspects of embodiments will be set forth in part in the description which follows and, in part, will be apparent from the description, or may be learned by practice of the disclosure.

EFFECT

According to an embodiment, to avoid a collision of a preamble when newly installing a base station in a mobile communication system, a cell identifier that is not allocated to neighboring small-sized base stations may be selected using predetermined parameters for each cell identifier, and the collision of the preamble may be avoided using a parameter corresponding to the selected cell identifier.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
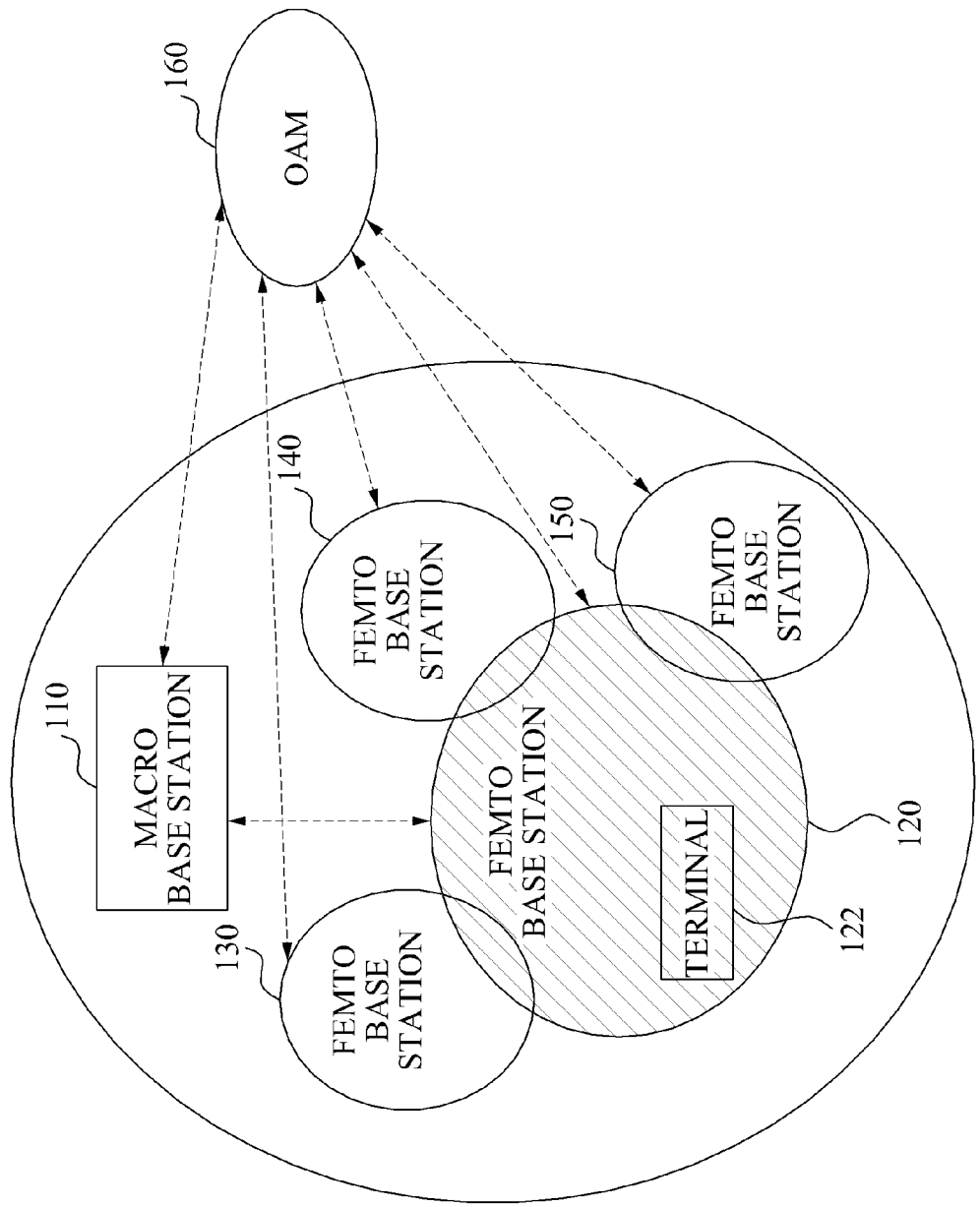
FIG. 1 illustrates a configuration of a mobile communication system according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

Embodiments of the invention may relate to a method and apparatus of avoiding a collision of a preamble using cell identifiers of neighboring small-sized base stations adjacent to a newly installed or deployed small-sized base station, by differently setting a preamble parameter of the newly installed or deployed small-sized base station from the neighboring small-sized base stations.

FIG. 1 illustrates a configuration of a mobile communication system according to an embodiment. In FIG. 1, a relation between a newly deployed base station, used for preventing a collision of a preamble, and peripheral devices is illustrated. For convenience of description, a small-sized base station may be referred to as a femto base station, however, is not limited thereto. Referring to FIG. 1, a femto base station 120 included in a newly installed or deployed small-sized base station may collect, from a terminal 122 within a cell area of the femto base station 120 or peripheral devices such as a macro base station 110 and femto base stations 130, 140, and 150, Physical Cell Identifiers (PCIs), that is, cell identifiers of neighboring small-sized base stations adjacent to the newly installed or deployed small-sized base station.

The femto base station 120 may collect PCIs of neighboring cells through a specific interface with the peripheral devices. Alternatively, the femto base station 120 may collect the PCIs of the neighboring cells by receiving System Information Block (SIB) from the femto base stations 130, 140, and 150 controlling the neighboring cells 130, 140, and 150. The femto base station 120 may identify the neighboring cells using the PCIs of the neighboring cells.

The femto base station 120 included in the newly installed or deployed small-sized base station may select a PCI that is not used in the neighboring cells, using predetermined parameters for each of the PCIs, that is, the cell identifiers, and may allocate a preamble set using parameters corresponding to the selected PCI.

An Operation Administration Maintenance (OAM) 160 may manage the PCI, that is, the cell identifier of each of the small-sized base stations, and set and transmit the PCI and parameters corresponding to the PCI when receiving a request for a setting of parameters from a small-sized base station that fails to perform a setting of parameters.

Figure 2:
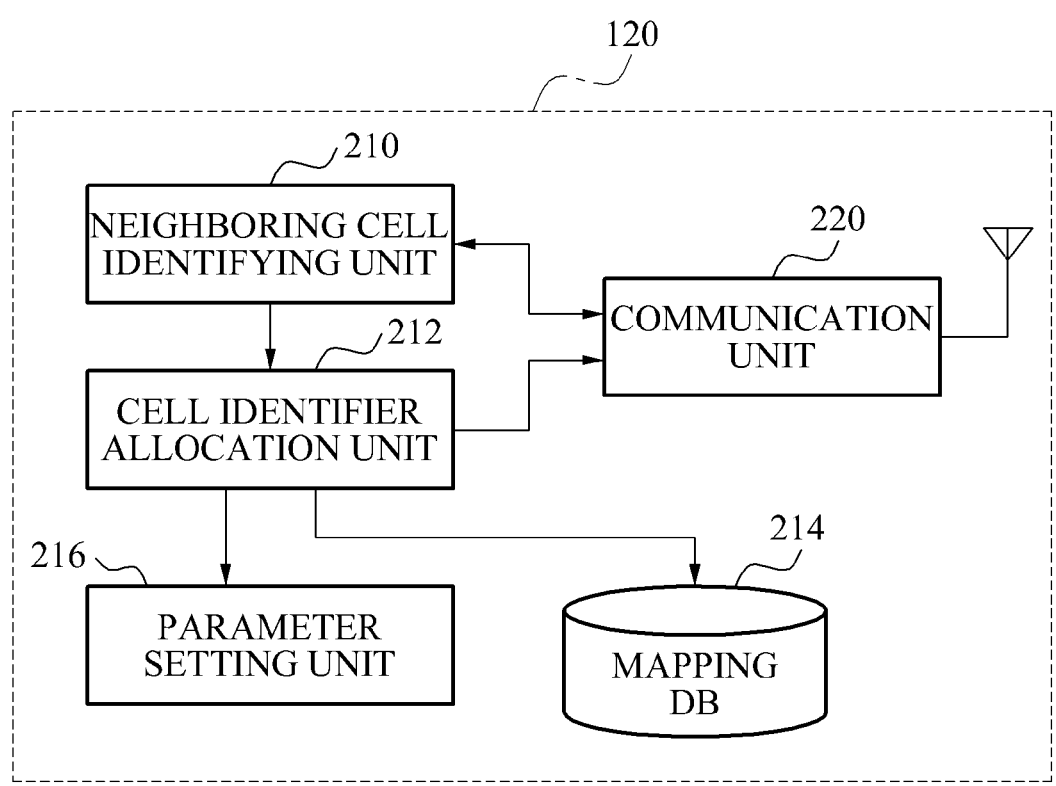
FIG. 2 illustrates a configuration of a femto base station of FIG. 1 that avoids a collision of a preamble.

FIG. 2 illustrates a configuration of the femto base station 120 of FIG. 1 that avoids a collision of a preamble according to an embodiment. In FIG. 2, the small-sized base station that may set parameters being capable of independently avoiding the collision of the preamble is illustrated. Referring to FIG. 2, the femto base station 120, that is, a small-sized base station includes a neighboring cell identifying unit 210, a cell identifier allocation unit 212, a mapping database (DB) 214, a parameter setting unit 216, and a communication unit 220.

The neighboring cell identifying unit 210 may collect a cell identifier of a neighboring cell to verify presence/absence of the neighboring cell and to identify the neighboring cell. The neighboring cell identifying unit 210 may collect the cell identifier of the neighboring cell, through a specific interface, from a peripheral device such as a macro base station and a femto base station or from a terminal within a cell area of the femto base station 120. Alternatively, the neighboring cell identifying unit 210 may receive a System Information Block (SIB) from the terminal within the cell area or the peripheral device, and may acquire the cell identifier of the neighboring cell from the SIB. As the cell identifier, a Physical Cell Identifier (PCI) may be used.

The mapping DB 214 may store predetermined parameters corresponding to each of predetermined cell identifiers. In this instance, the predetermined parameters may include code parameters, time parameters, and frequency parameters.

The cell identifier allocation unit 212 may select, from the mapping DB 214, a cell identifier unused in neighboring cells, using the cell identifier of the neighboring cell obtained in the neighboring cell identifying unit 210, and may allocate the selected cell identifier to a corresponding small-sized base station.

The cell identifier allocation unit 212 may transmit, to the OAM 160, information about the allocated cell identifier.

The parameter setting unit 216 may verify, in the mapping DB 214, parameters corresponding to the allocated cell identifier obtained in the cell identifier allocation unit 212, and set the verified parameters as parameters of the preamble.

The communication unit 220 may receive the cell identifier of the neighboring cell from the neighboring cell, and transmit the allocated cell identifier to the OAM 160.

Figure 3:
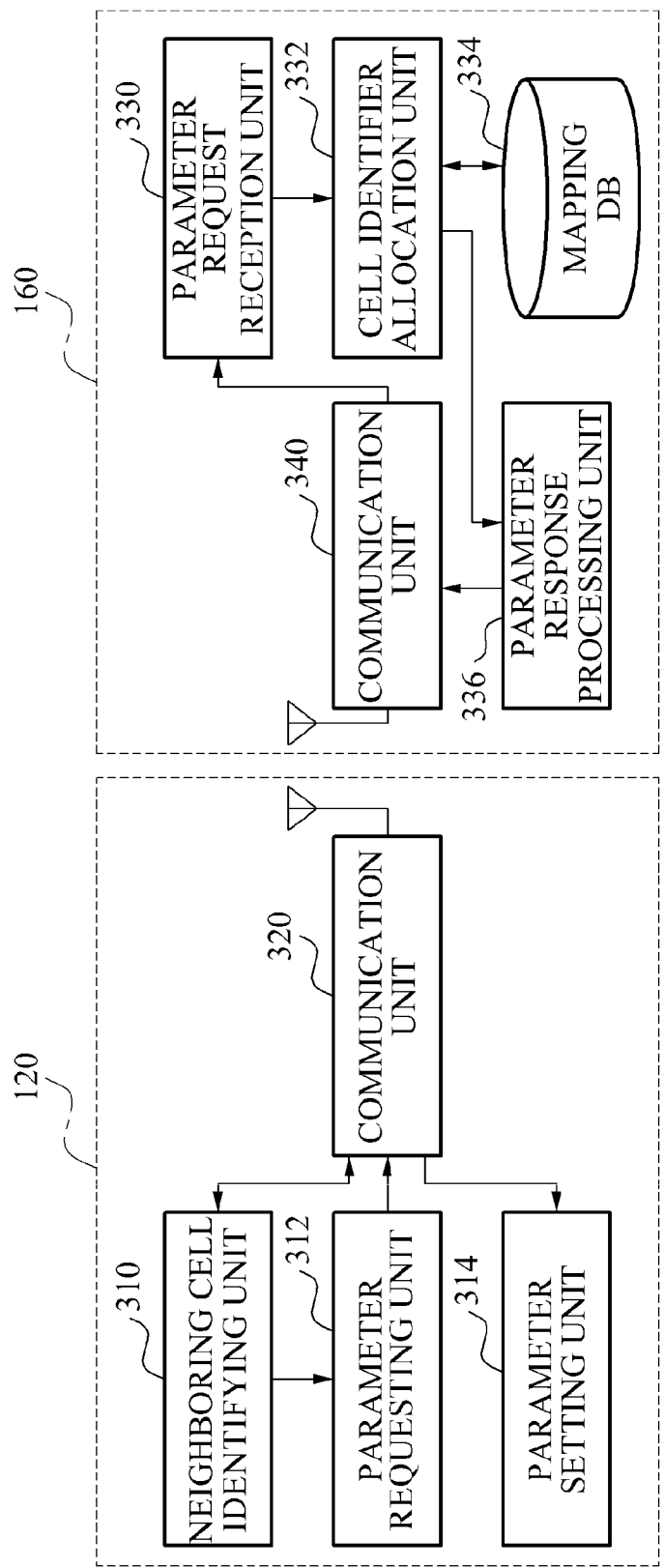
FIG. 3 illustrates a configuration of the femto base station of FIG. 1 that avoids a collision of a preamble, and a configuration of an Operation Administration Maintenance (OAM) of FIG. 1.

FIG. 3 illustrates a configuration of the femto base station 120 of FIG. 1 that avoids a collision of a preamble, and a configuration of the OAM 160 of FIG. 1. In FIG. 3, the femto base station 120 that may not set parameters being capable of independently avoiding the collision of the preamble, and the OAM 160 that may set the parameters being capable of independently avoiding the collision of the preamble are illustrated.

Referring to FIG. 3, in a case of a small-sized base station, that is, the femto base station 120, that may not independently set parameters, the femto base station 120 includes a neighboring cell identifying unit 310, a parameter requesting unit 312, a parameter setting unit 314, and a communication unit 320.

The neighboring cell identifying unit 310 may collect a cell identifier of a neighboring cell to verify presence/absence of the neighboring cell, and to identify the neighboring cell. The neighboring cell identifying unit 310 may collect the cell identifier of the neighboring cell, through a specific interface, from a terminal within a cell area of the femto base station 120 or a peripheral device such as a macro base station and a femto base station. Alternatively, the neighboring cell identifying unit 210 may receive an SIB from the terminal within the cell area or the peripheral device, and may obtain the cell identifier of the neighboring cell from the SIB. As the cell identifier, a PCI may be used.

The parameter requesting unit 312 may generate a parameter request message requesting a setting of parameters for the cell identifier and the preamble, and transmit the generated parameter request message to the OAM 160 via the communication unit 320. In this instance, the parameter request message may include the cell identifier of the neighboring cell.

The parameter setting unit 314 may verify an allocated cell identifier included in a parameter response message and parameters corresponding to the allocated cell identifier when receiving the parameter response message from the OAM 160, and may set parameters to be used for a preamble. The set parameters may include code parameters, time parameters, and frequency parameters.

The communication unit 320 may receive the cell identifier of the neighboring cell from the neighboring cell, transmit the parameter request message to the OAM 160, and receive the parameter response message from the OAM 160.

The OAM 160 being capable of setting a parameter includes a parameter requesting reception unit 330, a cell identifier allocation unit 332, a mapping DB 334, a parameter response processing unit 336, and a communication unit 340.

When receiving a parameter request message from a small-sized base station being incapable of independently setting the parameter, the parameter request reception unit 330 may verify a cell identifier of a neighboring cell included in the parameter request message.

The mapping DB 334 may store predetermined parameters corresponding to each of predetermined cell identifiers. In this instance, the predetermined parameters may include code parameters, time parameters, and frequency parameters.

The cell identifier allocation unit 332 may select, from the mapping DB 334, a cell identifier unused in a neighboring cell using the cell identifier of the neighboring cell verified in the parameter requesting reception unit 330, and allocate the selected cell identifier to a corresponding small-sized base station.

The parameter response processing unit 336 may verify, in the mapping DB 334, parameters corresponding to the cell identifier allocated in the cell identifier allocation unit 332. The parameter response processing unit 336 may generate the parameter response message including the allocated cell identifier and parameters corresponding to the allocated cell identifier, and transmit the generated parameter response message to a small-sized base station requesting the parameters via the communication unit 340.

The communication unit 340 may provide a communication connection with small-sized base stations.

Hereinafter, a method of avoiding a collision of an uplink preamble using a cell identifier will be described with reference to FIGS. 4 and 5.

Figure 4:
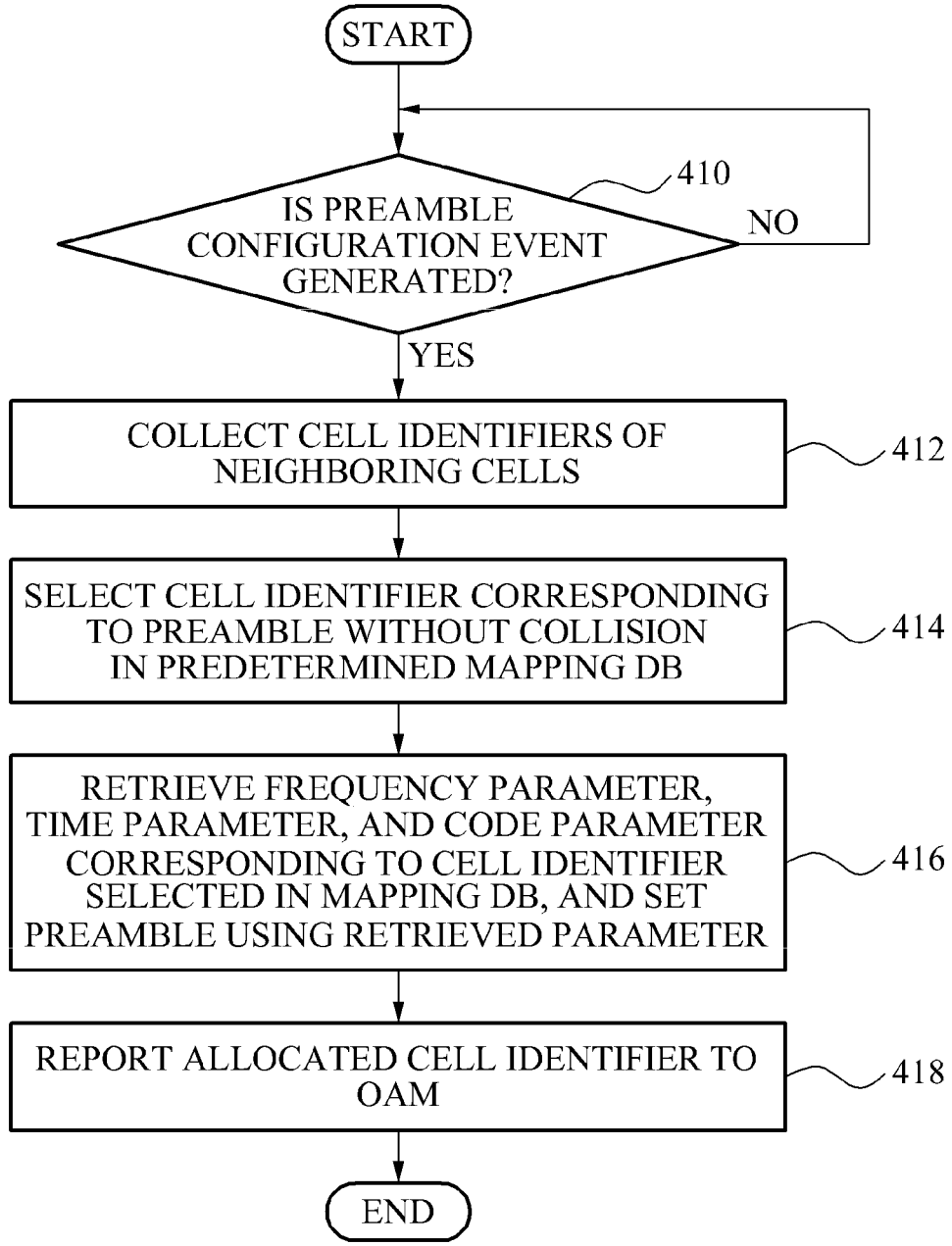
FIG. 4 is a flowchart illustrating a process of avoiding a collision of a preamble in a small-sized base station according to an embodiment.

FIG. 4 is a flowchart illustrating a process of avoiding a collision of a preamble in a small-sized base station according to an embodiment.

Referring to FIG. 4, in operation 410, a small-sized base station that may set parameters capable of independently avoiding the collision of the preamble may determine whether occurrence of an event configuring the preamble is detected. In operation 412, when the occurrence of the event is detected in operation 410, the small-sized base station may collect a cell identifier of a neighboring cell to verify presence/absence of the neighboring cell and to identify the neighboring cell.

In operation 414, the small-sized base station may select, from the mapping DB where the parameters corresponding to the cell identifier is predetermined, a cell identifier corresponding to a preamble where the collision does not occur, and allocate the selected cell identifier to a corresponding small-sized base station.

In operation 416, the small-sized base station may retrieve, from the mapping DB, frequency parameters, time parameters, and code parameters corresponding to the selected cell identifier, and set a preamble using the retrieved parameters. In operation 418, the small-sized base station may transmit the allocated cell identifier to the OAM.

Figure 5:
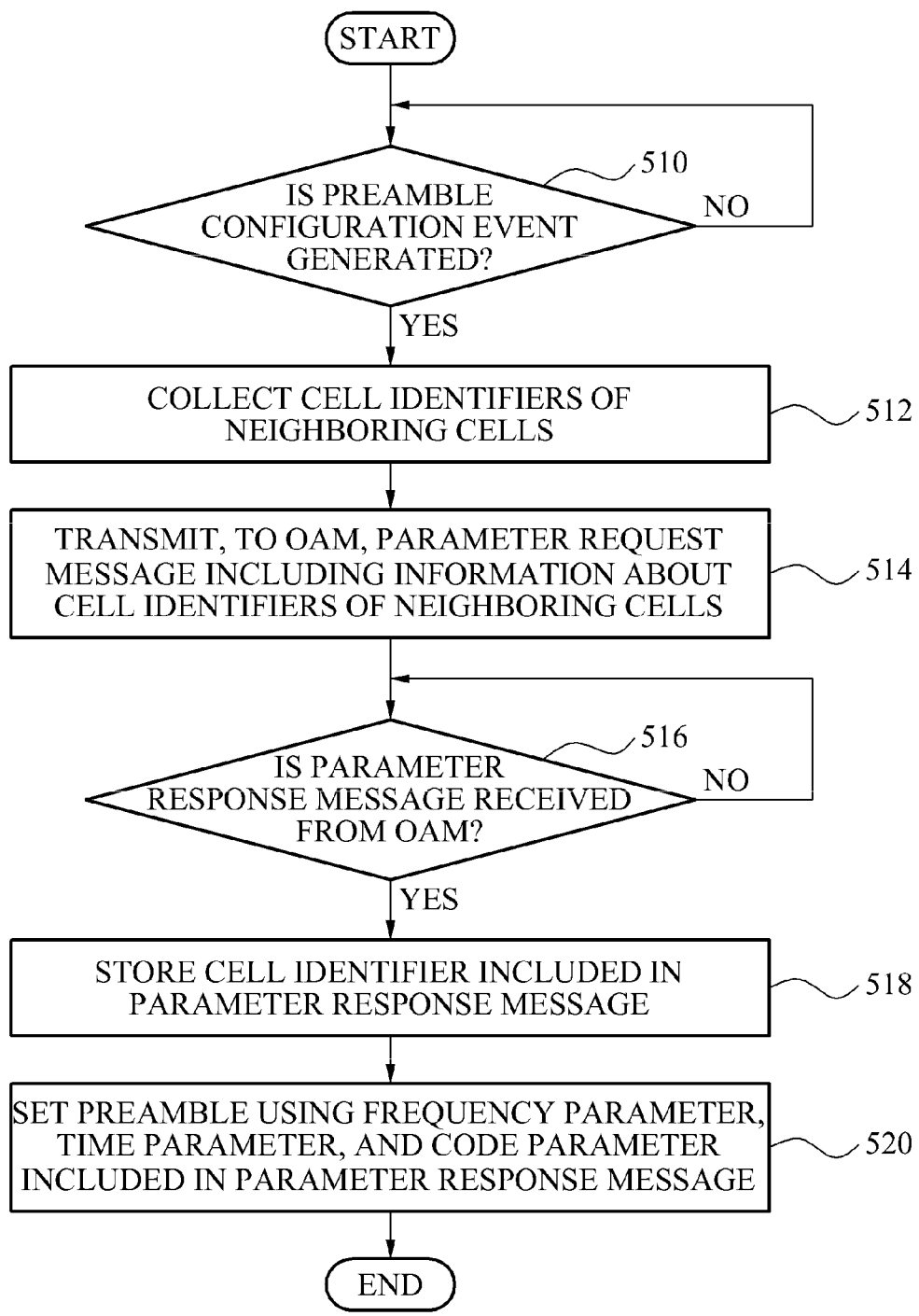
FIG. 5 is a flowchart illustrating a process of avoiding a collision of a preamble by requesting a parameter, in a small-sized base station according to an embodiment.

FIG. 5 is a flowchart illustrating a process of avoiding a collision of a preamble by requesting a parameter, in a small-sized base station according to an embodiment.

Referring to FIG. 5, in operation 510, a small-sized base station that may not set parameters capable of independently avoiding the collision of the preamble may determine whether occurrence of an event configuring the preamble is detected. In operation 512, when the occurrence of the event is detected in operation 510, the small-sized base station may collect a cell identifier of a neighboring cell to verify presence/absence of the neighboring cell and to identify the neighboring cell.

In operation 514, the small-sized base station may transmit, to an OAM, a parameter request message including information about the cell identifier of the neighboring cell.

In operation 516, the small-sized base station may determine whether a parameter response message is received from the OAM. In operation 518, when the parameter response message is received from the OAM, the small-sized base station may store a cell identifier included in the parameter response message. In operation 520, the small-sized base station may set the preamble using frequency parameters, time parameters, and code parameters which are included in the parameter response message.

Figure 6:
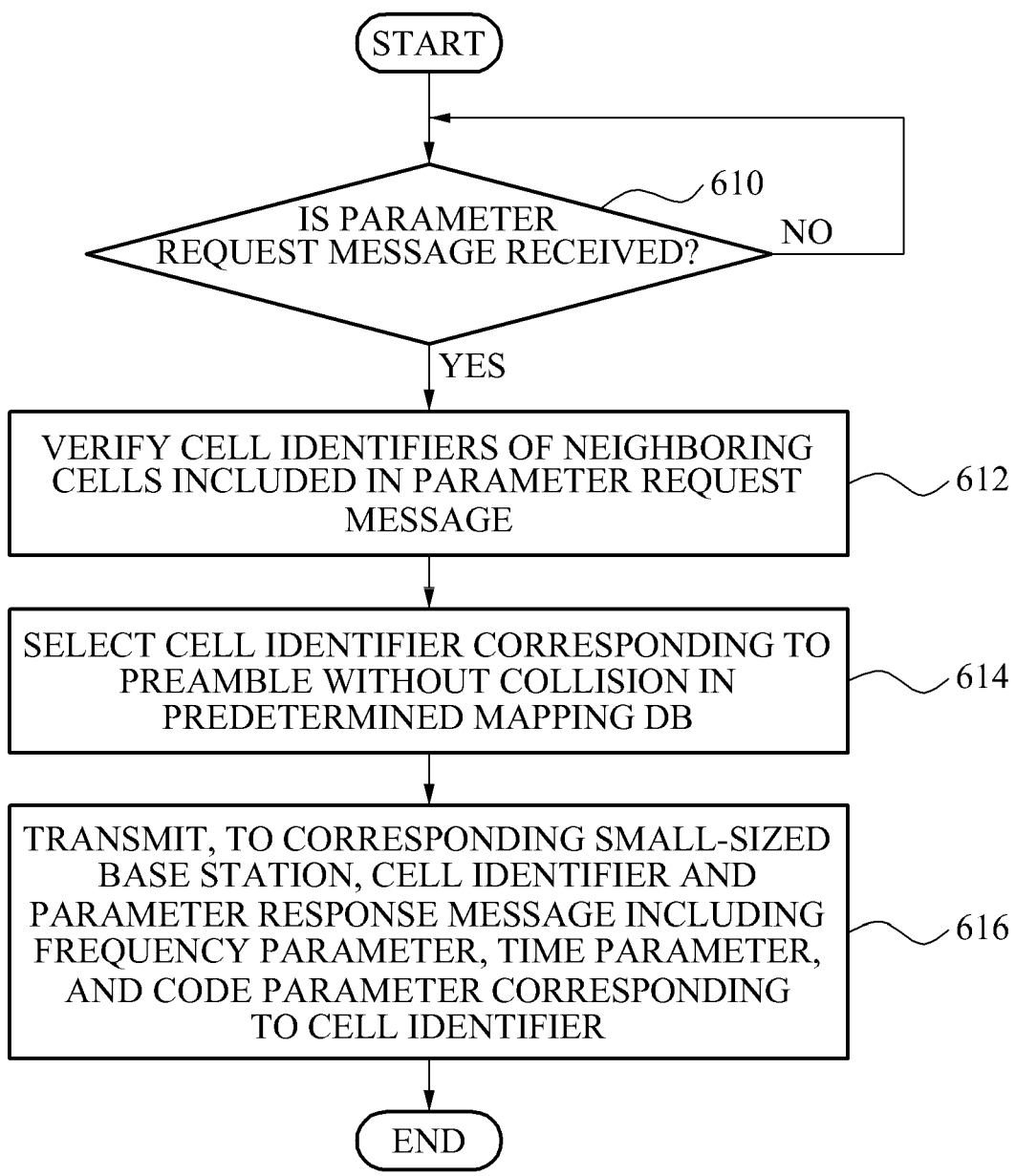
FIG. 6 is a flowchart illustrating a process of allocating parameters to avoid a collision of a preamble in an OAM according to an embodiment.

FIG. 6 is a flowchart illustrating a process of allocating parameters to avoid a collision of a preamble in an OAM according to an embodiment.

Referring to FIG. 6, in operation 610, an OAM that may set parameters capable of independently avoiding the collision of the preamble may determine whether a parameter request message is received from a small-sized base station incapable of setting parameters. In operation 612, when the parameter request message is received from the small-sized base station, the OAM may identify a cell identifier of a neighboring cell included in the parameter request message.

In operation 614, the OAM may select, from the mapping DB where parameters corresponding to the cell identifier are predetermined, a cell identifier corresponding to a preamble where the collision does not occur.

In operation 616, the OAM may transmit, to a corresponding small-sized base station, a parameter response message including the cell identifier and frequency parameters, time parameters, and code parameters corresponding to the cell identifier.

The methods according to the above-described embodiments may be recorded in computer-readable non-transitory storage media including program instructions to implement various operations embodied by a computer. The media may also include, alone or in combination with the program instructions, data files, data structures, and the like. Examples of computer-readable non-transitory media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for avoiding collision of a preamble in a small-sized base station, the apparatus comprising:
a neighboring cell identifying unit to collect a cell identifier of a neighboring cell to verify presence/absence of the neighboring cell and to identify the neighboring cell;
a parameter requesting unit to generate a parameter request message requesting a setting of parameters and including the cell identifier of the neighboring cell, and to transmit the generated parameter request message to an operation administration maintenance (OAM); and
a parameter setting unit to verify an allocated cell identifier included in a parameter response message and parameters corresponding to the allocated cell identifier when receiving the parameter response message from the OAM, and to set a preamble using the verified parameters.

2. The apparatus of claim 1, wherein the parameters are at least one of code parameters, time parameters, and frequency parameters.

3. The apparatus of claim 1, wherein the neighboring cell identifying unit receives information about the neighboring cell through an interface with a terminal within a cell area or with a peripheral device.

4. The apparatus of claim 1, wherein the neighboring cell identifying unit collects the information about the neighboring cell from an SIB received from a terminal within a cell area or a peripheral device.

5. The apparatus of claim 3, wherein the peripheral device includes an upper macro base station, a peripheral femto base station, and a peripheral pico base station.

6. An apparatus for avoiding collision of a preamble in an operation administration maintenance (OAM), the apparatus comprising:
a parameter request reception unit to verify a cell identifier of a neighboring cell included in a parameter request message when receiving the parameter request message from a small-sized base station being incapable of independently setting a parameter;
a mapping database to store predetermined parameters corresponding to each of predetermined cell identifiers;
a cell identifier allocation unit to select, from the mapping database, a cell identifier unused in neighboring cells, and to allocate the selected cell identifier to a corresponding small-sized base station; and
a parameter response processing unit to verify, in the mapping database, parameters corresponding to the allocated cell identifier, to generate a parameter response message including the allocated cell identifier and the parameters corresponding to the allocated cell identifier, and to transmit the generated parameter response message to the small-sized base station.

7. The apparatus of claim 6, wherein the parameters are at least one of code parameters, time parameters, and frequency parameters.

8. A method for avoiding a collision of a preamble in a small-sized base station, the method comprising:
collecting a cell identifier of a neighboring cell to verify presence/absence of the neighboring cells, and to identify the neighboring cell;
generating a parameter request message including the cell identifier of the neighboring cell requesting a setting of parameters, transmitting the generated parameter request message; and
verifying an allocated cell identifier included in the parameter request message and parameters corresponding to the allocated cell identifier when receiving a parameter response message from an OAM; and
setting the preamble using the verified parameters.

9. The method of claim 8, wherein the parameters are at least one of code parameters, time parameters, and frequency parameters.

10. A method for avoiding collision of a preamble in an OAM, the method comprising:
verifying a cell identifier of a neighboring cell included in a parameter request message when receiving the parameter request message from a small-sized base station being incapable of independently setting a parameter;

selecting, from a mapping database where predetermined parameters corresponding to each of predetermined cell identifiers are stored, a cell identifier unused in neighboring cells, and allocating, to the small-sized base station, the selected cell identifier as a cell identifier of the small-sized base station;

verifying, in the mapping database, parameters corresponding to the allocated cell identifier; and generating a parameter response message including the allocated cell identifier and parameters corresponding to the allocated cell identifier, and transmitting the generated parameter response message to the small-sized base station.

11. The method of claim 10, wherein the parameters are at least one of code parameters, time parameters, and frequency parameters.

* * * * *